(12) United States Patent
Gupta et al.

(10) Patent No.: US 9,888,380 B2
(45) Date of Patent: Feb. 6, 2018

(54) METHODS AND SYSTEMS FOR VALIDATING MOBILE DEVICES OF CUSTOMERS VIA THIRD PARTIES

(71) Applicant: The Western Union Company, Englewood, CO (US)

(72) Inventors: Abhinav Gupta, Foster City, CA (US); Bernard McManus, Foster City, CA (US); Don McNelley, Sausalito, CA (US)

(73) Assignee: The Western Union Company, Englewood, CO (US)

( * ) Notice: Subject to any disclaimer, the term of this patent is extended or adjusted under 35 U.S.C. 154(b) by 261 days.

(21) Appl. No.: 14/528,274

(22) Filed: Oct. 30, 2014

(65) Prior Publication Data

US 2016/0127898 A1     May 5, 2016

(51) Int. Cl.
| | |
|---|---|
| G06F 7/04 | (2006.01) |
| H04W 12/06 | (2009.01) |
| H04L 29/06 | (2006.01) |
| G06F 21/43 | (2013.01) |
| G06Q 20/32 | (2012.01) |
| G06Q 20/42 | (2012.01) |
| G06F 21/55 | (2013.01) |

(52) U.S. Cl.
CPC ............ *H04W 12/06* (2013.01); *G06F 21/43* (2013.01); *G06F 21/552* (2013.01); *G06Q 20/3223* (2013.01); *G06Q 20/425* (2013.01); *H04L 63/0876* (2013.01); *H04L 63/18* (2013.01)

(58) Field of Classification Search
CPC .. H04W 12/06; H04W 12/12; G06Q 20/3221; G06Q 20/4014; G06F 21/43; H04L 63/0876
See application file for complete search history.

(56) References Cited

U.S. PATENT DOCUMENTS

| | | | | |
|---|---|---|---|---|
| 7,831,246 | B1 * | 11/2010 | Smith | .................... G06Q 20/40 455/408 |
| 8,706,557 | B1 * | 4/2014 | Tavares | ................ G06Q 20/204 705/16 |
| 2002/0035539 | A1 * | 3/2002 | O'Connell | ............. G06Q 20/02 705/39 |

(Continued)

*Primary Examiner* — Khoi Le
(74) *Attorney, Agent, or Firm* — Kilpatrick Townsend & Stockton, LLP

(57) ABSTRACT

A method for authenticating a mobile device in real-time. The method includes detecting the mobile device, sending a text message containing a unique uniform resource locator ("URL") to the mobile device, and detecting an access of the unique URL by the mobile device through a first communication path. In response to detecting the access of the unique URL, requesting and subsequently receiving, by the host system in real-time, a phone number and a subscriber identification ID associated with the mobile device through a second communication path distinct from the first communication path, and a device fingerprint of the mobile device through the first communication path. The method further includes initiating a risk analysis based on the phone number, the subscriber ID, and the device fingerprint and determining an authentication status of the mobile device based on the risk analysis.

19 Claims, 6 Drawing Sheets

(56) References Cited

U.S. PATENT DOCUMENTS

| | | | | |
|---|---|---|---|---|
| 2003/0200184 | A1* | 10/2003 | Dominguez | G06Q 20/02 705/78 |
| 2006/0020799 | A1* | 1/2006 | Kemshall | H04L 12/58 713/170 |
| 2008/0056501 | A1* | 3/2008 | McGough | H04L 63/062 380/281 |
| 2010/0306076 | A1* | 12/2010 | Taveau | G06Q 20/02 705/26.8 |
| 2012/0047072 | A1* | 2/2012 | Larkin | G06Q 20/02 705/44 |
| 2012/0084206 | A1* | 4/2012 | Mehew | G06Q 20/40 705/44 |
| 2012/0144198 | A1* | 6/2012 | Har | H04L 63/0869 713/170 |
| 2013/0102313 | A1* | 4/2013 | Tinnakornsrisuphap | H04W 36/22 455/436 |
| 2013/0159195 | A1* | 6/2013 | Kirillin | G06Q 20/322 705/71 |
| 2013/0252585 | A1* | 9/2013 | Moshir | G06F 21/35 455/411 |
| 2014/0129441 | A1* | 5/2014 | Blanco | G06Q 20/322 705/44 |
| 2014/0200929 | A1* | 7/2014 | Fitzgerald | G06F 21/88 705/4 |

\* cited by examiner

METHODS AND SYSTEMS FOR VALIDATING MOBILE DEVICES OF CUSTOMERS VIA THIRD PARTIES

CROSS-REFERENCES TO RELATED APPLICATIONS

N/A

BACKGROUND OF THE INVENTION

Consumers have embraced the convenience of carrying out electronic financial transfers using mobile devices, such as smart phones and tablet computers. At the same time, electronic banking has become susceptible to fraudulent activity, for instance from fraudsters that intercept money transfers by compromising the mobile devices involved in the transfers and/or misdirecting funds into their own fraudulent bank accounts. Traditional methods for mitigating such fraudulent activity include second factor authentication that delivers pin codes via SMS (short message service) text messages, or delivers pin codes via a one-time token from a mobile application on the mobile device. However, such tokens are cumbersome and may only work for previously-registered users. Further, malware may compromise the mobile device and forward SMS messages, intercept voice calls, store and forward voice calls, access cameras, GPS on the phone, and send SMS from the phone, thereby allowing a fraudster to complete the traditional SMS-based validation process. Such fraudulent attacks compromise the security and success of carrying out electronic financial transfers.

There is a need for a more secure validation process. This disclosure is intended to address the above-noted concerns and to provide related advantages.

BRIEF SUMMARY OF THE INVENTION

This invention generally relates to systems and methods for authenticating mobile devices, and more specifically, to authenticating mobile devices using an out-of-band communication with a third party.

In one aspect of the present disclosure, a method for authenticating a mobile device in real-time prior to completion of a funds transfer is provided. The method may include detecting, by a host system, the mobile device in communication with the host system and sending, by the host system, a text message comprising a unique uniform resource locator ("URL") to the mobile device. The method may further include detecting, by the host system, an access of the unique URL by the mobile device through a first communication path. In response to detecting the access of the unique URL by the mobile device, the method may include requesting, by the host system, in real-time, a phone number and a subscriber identification ("ID") associated with the mobile device through a second communication path distinct from the first communication path, and a device fingerprint of the mobile device through the first communication path to identify the mobile device. Further, in response to requesting the phone number, the subscriber ID, and the device fingerprint by the host system, the method may include receiving, by the host system, in real-time, the phone number and the subscriber ID through the second communication path, and the requested device fingerprint through the first communication path. The method may further include initiating, by the host system, a risk analysis based on the phone number, the subscriber ID, and the device fingerprint, and determining, by the host system, an authentication status of the mobile device based on the risk analysis, wherein the authentication status comprises at least one of a verified and an unverified access.

Various embodiments of the method may include one or more of the following features. The method may include sending, by the host system, the text message comprising the URL to the mobile device through the first communication path, wherein the first communication path comprises a first communication channel between the mobile device and the host system through a cellular network, and wherein the second communication path comprises a second communication channel between the host system and a third party through an internet protocol ("IP") network. Further, the method may include sending, by the host system, user instructions to disable a WIFI connection prior to accessing the URL, wherein the text message comprises the user instructions. Another feature of the method may include, in response to detecting the access of the unique URL by the mobile device through the first communication path, transmitting, by the host system, a landing page to the mobile device in real-time through the first communication path, wherein the landing page opens in a mobile browser of the mobile device. Yet another feature of the method may include requesting, by the host system, the phone number and the subscriber ID from a third party through the second communication path, wherein the third party is distinct from the host system.

Other various embodiments of the method may include one or more of the following features. For instance, the method may include, in response to initiating the risk analysis based on the phone number, the subscriber ID, and the device fingerprint, comparing, by the host system, the phone number, the subscriber ID, and the device fingerprint with a stored phone number, a stored subscriber ID, and a stored device fingerprint, respectively, in real-time. In some aspects, the stored device fingerprint is a previous device fingerprint obtained from a previous communication with the host system by the mobile device. In other aspects, at least one of the device fingerprint and the stored device fingerprint comprises at least one of a user location, device name, network name, capacity figure, available capacity figure, operating system name, operating system version, carrier identification, model identification, serial number, one or more mobile apps installed, contacts, cookies, flash objects, browser plugins, gyro status, Bluetooth adapter, and MAC address. Still, in other aspects, the method may include, in response to the comparison, determining, by the host system in real-time, the authentication status is the verified access based on a match of at least the phone number and the subscriber ID with the stored phone number and the stored subscriber ID, respectively. Another feature of the method may include, based at least in part on the determined verified access, completing, by the host system, a funds transfer, wherein the funds transfer comprises moving a monetary amount from one account to another account. Yet another feature of the method may include, in response to the comparison, determining, by the host system in real-time, a mismatch of the device fingerprint and the stored device fingerprint, in response to the mismatch, requiring, by the host system in real-time, a secondary verification with the mobile device, and based at least in part on the secondary verification, determining, by the host system, the authentication status is the verified access having a different mobile device.

Still, other various embodiments of the method may include one or more of the following features. The method may include, in response to detecting the mobile device in communication with the host system, generating, by the host system in real-time, the unique URL. In another aspect, the method may include, in response to detecting the mobile device in communication with the host system, establishing, by the host system, the second communication path with a third party system in real-time, wherein the second communication path is an out-of-band path. In some aspects of the method, the first communication path and the second communication path utilize different communication channels in a same communication network. In other aspects of the method, the first communication path and the second communication path utilize different communication channels in different communication networks. Another feature of the method may include contacting, by the host system through the second communication path in real-time, a web service application programming interface ("API") associated with a third party to request the phone number and the subscriber ID.

In another aspect of the present disclosure, a host system for authenticating a mobile device in real-time prior to completion of a funds transfer is provided. The host system may include one or more processors and a memory communicatively coupled with and readable by the one or more processors and having stored therein processor-readable instructions that, when executed by the one or more processors, cause the one or more processors to perform one or more steps. The processor-readable instructions may cause the one or more processors to detect, by the host system, the mobile device in communication with the host system, send, by the host system, a text message comprising a unique uniform resource locator ("URL") to the mobile device, and detect, by the host system, an access of the unique URL by the mobile device through a first communication path. In another aspect, the processor-readable instructions may cause the one or more processors to, in response to detecting the access of the unique URL by the mobile device, request, by the host system, in real-time, a phone number and a subscriber identification ("ID") associated with the mobile device through a second communication path distinct from the first communication path, and in response to requesting the phone number and the subscriber ID by the host system, receive, by the host system, in real-time, the phone number and the subscriber ID through the second communication path. Further, the processor-readable instructions may cause the one or more processors to initiate, by the host system, a risk analysis based on the phone number and the subscriber ID, and determine, by the host system, an authentication status of the mobile device based on the risk analysis, wherein the authentication status comprises at least one of a verified or an unverified access.

In a further aspect of the present disclosure, a method for authenticating a mobile device in real-time prior to completion of a funds transfer is provided. The method may include detecting, by a host system through a first communication path, a login event to a mobile website by the mobile device in communication with the host system, and in response to detecting the login to the mobile website by the mobile device, requesting, by the host system, in real-time, a phone number and a subscriber identification ID associated with the mobile device through a second communication path distinct from the first communication path, and a device fingerprint of the mobile device through the first communication path to identify the mobile device. Further, the method may include, in response to requesting the phone number, the subscriber ID, and the device fingerprint by the host system, receiving, by the host system, in real-time, the phone number and the subscriber ID through the second communication path, and the requested device fingerprint through the first communication path. The method may further include initiating, by the host system, a risk analysis based on the phone number, the subscriber ID, and the device fingerprint, and determining, by the host system, an authentication status of the mobile device based on the risk analysis, wherein the authentication status comprises at least one of a verified or an unverified access.

Various embodiments of the method may include one or more of the following features. The login event may include a user login to a mobile website by the mobile device. In another aspect, the login event may include at least one of downloading a mobile application to the mobile device and a user login to the mobile application by the mobile device

Figure 1:
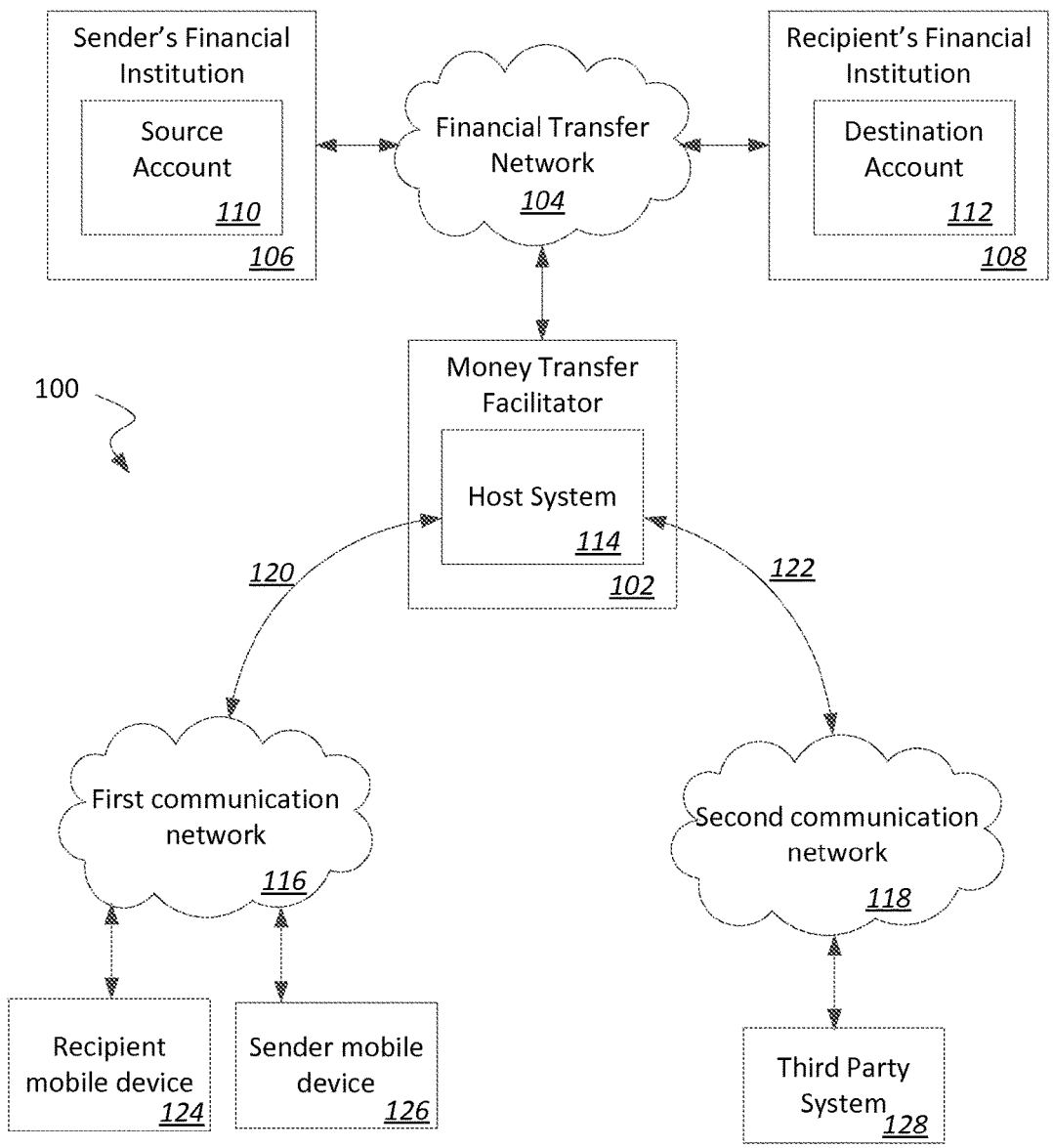
FIG. 1 is a block diagram illustrating a system for making financial transfers with a mobile device, according to various aspects of the present disclosure.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In general, the present disclosure is directed to systems and methods for out-of-band authentication of a mobile device in real-time prior to movement of any funds in a funds transfer. However, it is noted that the features discussed herein may be contemplated to occur during, or after, funds transfers as well. In some aspects, the systems and methods disclosed herein may be utilized to establish credentials of a new customer and/or to establish credentials of an existing customer using the customer's mobile device, such as but not limited to, a smart phone or tablet computer. It is contemplated that the systems and methods disclosed herein may eliminate and/or mitigate fraudulent activity that may arise from malware forwarding SMS-based validation messages by rendering such forwarded SMS-based validation messages unsuccessful or ineffective in the presently disclosed authentication systems and methods. A further benefit of the present disclosure is that the systems and methods disclosed herein may create additional friction and/or obstacles for such malware, which may deter fraud attacks directed to misappropriation or theft of money transfers, or to any other transaction or situation requiring verification of a mobile device or user thereof. For instance, the present systems and methods may deflect fraudulent attempts by increasing the difficulty of overcoming the validation processes disclosed herein. It is contemplated that the present systems and methods offer a more secure connection by providing for a more secure authentication process than prior, traditional solutions. Furthermore, the present systems and methods provide for an improved mobile login authentication by creating a seamless customer experience, whereby mobile login validation is silent to the customer and/or the customer's mobile device at the time of login. In another aspect, this method may further reduce and/or eliminate the need for validation messages if performed at a time of login. However, it should be understood that the description of these methods and systems are offered by way of example only and are not intended to limit the scope of embodiments disclosed herein. Rather, other methods and systems for supporting money transfer transactions may also be used with various embodiments of the present invention.

FIG. 1 is a block diagram illustrating a system 100 for making financial transfers and/or more particularly, for authenticating mobile devices prior to completing the financial transfers, according to various aspects of the present invention. It is noted, however, that the systems and methods disclosed herein may be utilized in a variety of different settings that may implement an out-of-band SMS system for verifying transactions, registrations, logins, password resets, and other applications. In some aspects, the present systems and methods can be performed for enhanced security at any time before, during, or after login.

As illustrated in FIG. 1, the system 100 can include a money transfer facilitator 102 system such as the systems operated by Western Union or another money transfer facilitator service. The money transfer facilitator 102 can be communicatively coupled with a financial transfer network 104. Also communicatively coupled with the financial transfer network 104 can be one or more financial institutions, such as a sender's financial institution 106 and a recipient's financial institution 108. Generally speaking and as understood by one skilled in the art, the money transfer facilitator 102 may access a source account 110 of the sender's financial institution 106 and/or a destination account 112 of the same or a different financial institution, such as the recipient's financial institution 108 to affect a transfer from and/or to the accounts 110,112 via the financial transfer network.

The money transfer facilitator 102 can also include or execute a host system 114. The host system 114 may be configured to support transactions involving one or more mobile devices, such as by carrying out an electronic financial transfer, which may involve identifying the entities and/or accounts associated with a transaction and/or determining a destination for a payment of the transaction. Further, the host system 114 of the money transfer facilitator 102 may implement an authentication process for authenticating a mobile device associated with a sender or recipient (each referred to herein as a "customer"), as shown further in subsequent FIGS. 3-6. For instance, the host system 114 may include a communication system that permits one and/or two-way communication paths or channels 120,122 between the host system 114 and one or more various communication networks, such as a first communication network 116 and a second communication network 118. It is contemplated that the first and/or second communication networks 116,118 may be different networks or the same network, and may comprise cellular network communication protocols that utilize cellular communication towers and/or an internet protocol (IP) communications network. In one aspect of the present invention, the first communication network 116 comprises a cellular communication network, such as but not limited to, 2G, 3G, 4G, 5G, LTE, Edge, GSM, CDMA, etc., and the second communication network 118 comprises an IP communications network.

As further shown in FIG. 1, the host system 114 may establish bidirectional communication with a recipient mobile device 124 and/or a sender mobile device 126 via the first communication network 116 through the first communication path 120. In another aspect of the present system 100, the host system 114 may establish bidirectional communication with a third party system 128 via the second communication network 118 through the second communication path 122, whereby the third party system 128 is utilized for an authentication procedure of the mobile devices 124,126 as described further below. In a preferred embodiment, the first communication path 120 is separate and distinct from the second communication path 122, such that the second communication path is an out-of-band communication path. Further, it is noted that both communication paths 120,122 may utilize separate or the same communication networks 116,118. In a preferred embodiment, the first communication path 116 connecting the host system 114 with the mobile devices 124,126 is implemented using the cellular connection network, while the second communication path 122 utilizes the IP communication network to interact with the third party system 128. It is contemplated that the system 100 may operate internationally and/or domestically.

Further, in another aspect, the third party system 128 exists as a separate entity from the host system 114. The third party system 128 contains a customer authentication database comprising various customer information, such as a phone number associated with each customer's mobile device 124,126 and/or a subscriber identification ("ID") associated with each mobile phone line carrier account, which may further be associated with each mobile device 124,126. It is contemplated that the third party system 128 may be accessed by the host system 114 in real-time via the second communication path 122 or out-of-band path to enable look-up of the customer information upon request by the host system 114. In that case, in some embodiments, it is contemplated that the mobile device 124,126 associated with the customer information that is looked-up through the second communication path 122 may be unaware of the real-time, look-up communications occurring in the out-of-band path. Other embodiments are possible.

It is worthy to note that additional communication paths and connections may be contemplated in the system 100 that are not immediately shown in FIG. 1. For instance, and merely by way of example, the recipient mobile device 124 and the sender mobile device 126 may be connected to more than one network at a time, such as connected to both the first and second communication networks 116,118, simultaneously, and that either connection may be initiated and/or terminated without affecting the other connection. Further, it should be noted that the names sender, recipient, first, and second are used only to illustrate a particular entity's and/or device's function at a given time and are not intended to imply any limitations on the functions that can be performed by a given entity and/or device. For instance, any given entity and/or device associated with that entity can alternately act as sender or recipient. Still further, it should be noted that additional entities may be incorporated in the system 100 that are not shown in FIG. 1, such as, and merely by way of example, an agent comprising a retail outlet location and providing channels by which entities can access services of the money transfer facilitator 102. Generally speaking, the system 100 shown in FIG. 1 provides for financial transfers utilizing a mobile device, such as either of the mobile devices 124,126, and for authenticating the mobile device in connection with the money transfer facilitator 102 and involved in such transfers.

Figure 2:
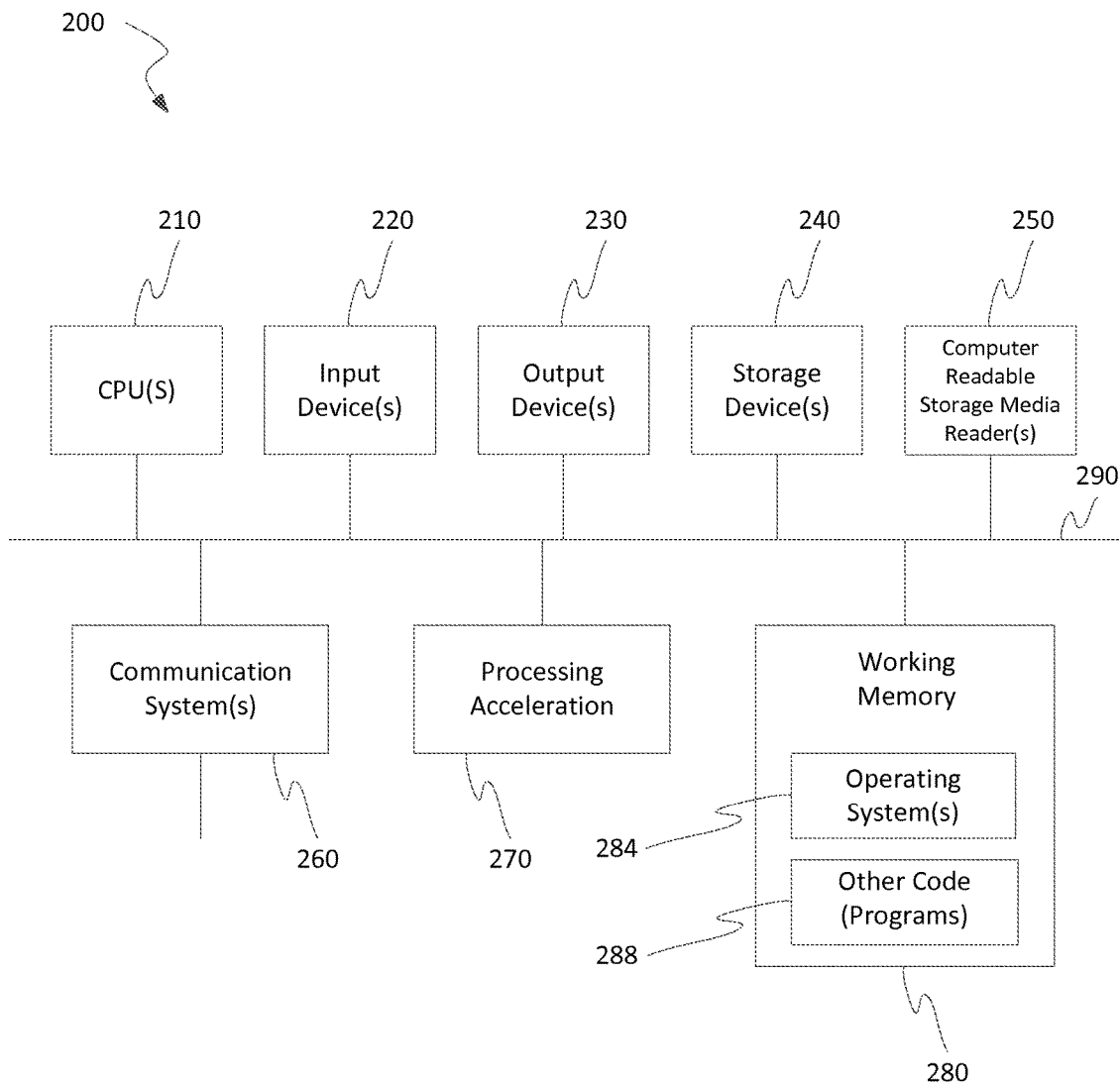
FIG. 2 is a block diagram illustrating a computer architecture upon which various aspects of the present disclosure may be implemented.

Turning now to FIG. 2, a block diagram is shown illustrating a computer system upon which embodiments of the present invention may be implemented. This example illustrates a computer system 200 such as may be used, in whole, in part, or with various modifications, to provide the functions of the mobile devices 124,126, the money transfer facilitator 102, host system 114, the third party system 128, and/or other components of the invention such as those discussed in FIG. 1.

The computer system 200 is shown comprising hardware elements that may be electrically coupled via a bus 290. The hardware elements may include one or more central processing units 210, one or more input devices 220 (e.g., a mouse, a keyboard, etc.), and one or more output devices 230 (e.g., a display device, a printer, etc.). The computer system 200 may also include one or more storage device 240. By way of example, storage device(s) 240 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 250, a communications system 260 (e.g., a modem, a network card (wireless or wired), an infra-red communication device, Bluetooth™ device, cellular communication device, etc.), and working memory 280, which may include RAM and ROM devices as described above. In some embodiments, the computer system 200 may also include a processing acceleration unit 270, which can include a digital signal processor, a special-purpose processor and/or the like.

The computer-readable storage media reader 250 can further be connected to a computer-readable storage medium, together (and, optionally, in combination with storage device(s) 240) comprehensively representing remote, local, fixed, and/or removable storage devices plus storage media for temporarily and/or more permanently containing computer-readable information. The communications system 260 may permit data to be exchanged with a network, system, computer and/or other component described above.

The computer system 200 may also comprise software elements, shown as being currently located within a working memory 280, including an operating system 284 and/or other code 288. It should be appreciated that alternate embodiments of a computer system 200 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 200 may include code 288 for implementing any or all of the function of the various elements of the architecture as described herein. For example, software, stored on and/or executed by a computer system such as system 200, can provide the functions of the sending subscriber interface, the receiving subscriber interface, the agent server 125, the source transfer network 165, the primary transfer network 160, the destination transfer network 190, the communication network 115, and/or other components of the invention such as those discussed above.

Figure 3:
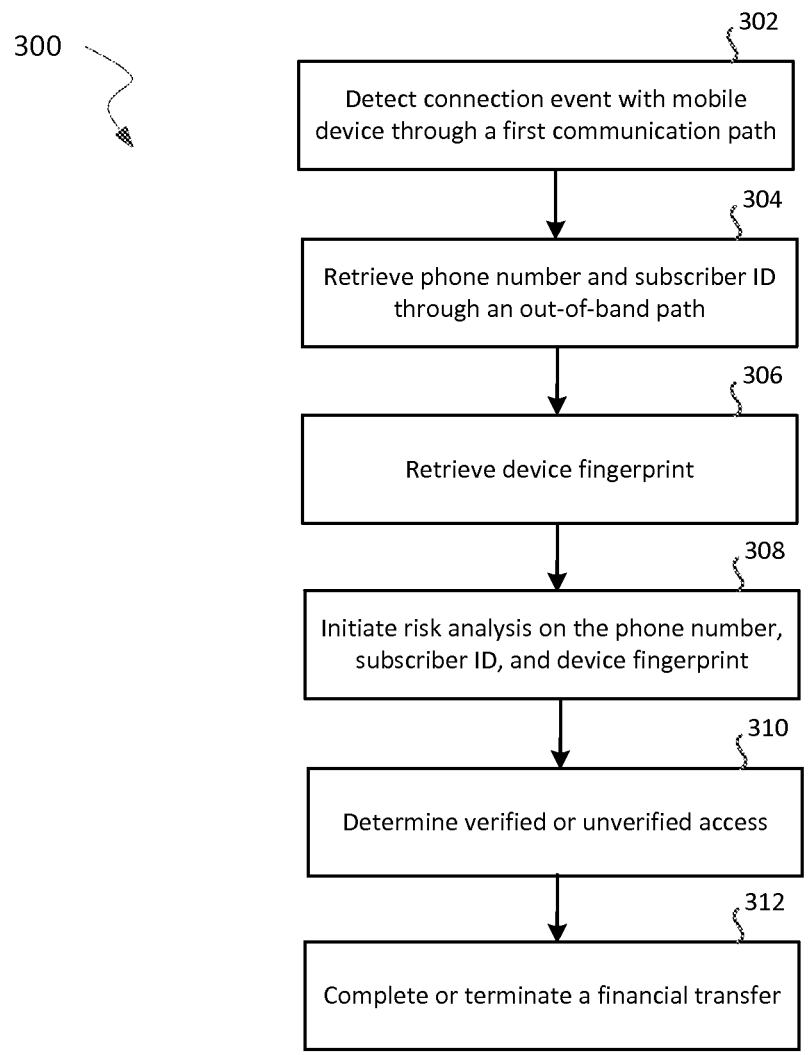
FIG. 3 is a block diagram of a method for validating a mobile device of a customer via a third party, according to various aspects of the present invention.

Referring now to FIG. 3, a block diagram shows a method 300 for validating a customer's mobile device through a third party. For instance, the method 300 may be implemented by the host system 114 of the money transfer facilitator 102 to authenticate either mobile device 124,126 using the third party system 128 of FIG. 1. It is contemplated that any of the steps shown in the method 300 may be optional and/or rearranged, and that the method 300 may include additional steps, intermediate or otherwise, not shown in the present illustration.

The method 300 may include detecting, by the host system 114 a connection event between the host system 114 and the customer's mobile device (step 302). It is contemplated that the connection event may be detected through a first communication path, such as the first communication path 120, which may utilize a cellular network connection. Such connection events that are detected by the host system 114 may include, merely by way of example, an initiation of a funds transfer by the customer's mobile device, a new customer registration procedure, a login or an access of a mobile application and/or website associated with the money transfer facilitator 102 by the mobile device, an access, e.g. click, of a unique uniform resource locator ("URL") by the mobile device, and/or reception of a user selection to authenticate the user's mobile device prior to completion of a funds transfer.

The method 300 may further include retrieving, by the host system 114, a phone number and/or a subscriber identification ("ID") associated with the mobile device through an out-of-band communication path, such as the second communication path 122 which may utilize an IP communications network (step 304). In an exemplary embodiment, the phone number and/or subscriber ID are retrieved from the third party system 128 through the out-of-band communication path in real-time. That is, the phone number and/or subscriber ID are retrieved, or the retrieval is initiated, immediately upon detecting the connection event. Further, the method 300 may include retrieving, by the host system 114, a device fingerprint (step 306) upon detecting the connection event, such as in real-time upon detecting a click on the unique URL or login to the mobile website or application. In some aspects, the device fingerprint may be retrieved through the same communication path in which the connection event was detected at step 302, i.e. the first communication path 120 utilizing the cellular network. In other aspects, the device fingerprint may be retrieved through other communication paths and networks. The device fingerprint may include any one or more of the following: a user location, device name, network name, capacity figure, available capacity figure, operating system name, operating system version, carrier identification, model identification, serial number, one or more mobile apps installed, contacts, cookies, flash objects, browser plugins, gyro status, Bluetooth adapter, and MAC address.

The method 300 may further comprise executing, by the host system 114, a risk analysis, such as risk model, based on the phone number, the subscriber ID, and the device fingerprint retrieved in the previous steps (step 308). In one example, the risk analysis may comprise comparing the retrieved phone number, subscriber ID, and device fingerprint with a stored phone number, a stored subscriber ID, and a stored device fingerprint, to determine if there is a sufficient match or a mismatch. Based on the risk analysis, the host system 114 may determine an authentication status, such as a verified access or an unverified access (step 310). Further, the method 300 may include completing, or authorizing to complete, by the host system 114, a financial transfer based on determination of a verified access of the mobile device being examined (step 312). Completing the financial transfer may comprise a successful movement of money from one account to another. In other cases, at step 312, the host system 114 may terminate, or instruct to terminate, a financial transfer based on an unverified access as determined by the host system 114. Terminating the financial transfer may comprise ending any transaction or opportunity for funds to be moved from one account to another. Still, in other cases, the method may comprise completing or terminating any type of transaction, registration, login, password reset, and the like, based on the determination of the verified, or unverified, access of the mobile device.

Figure 4:
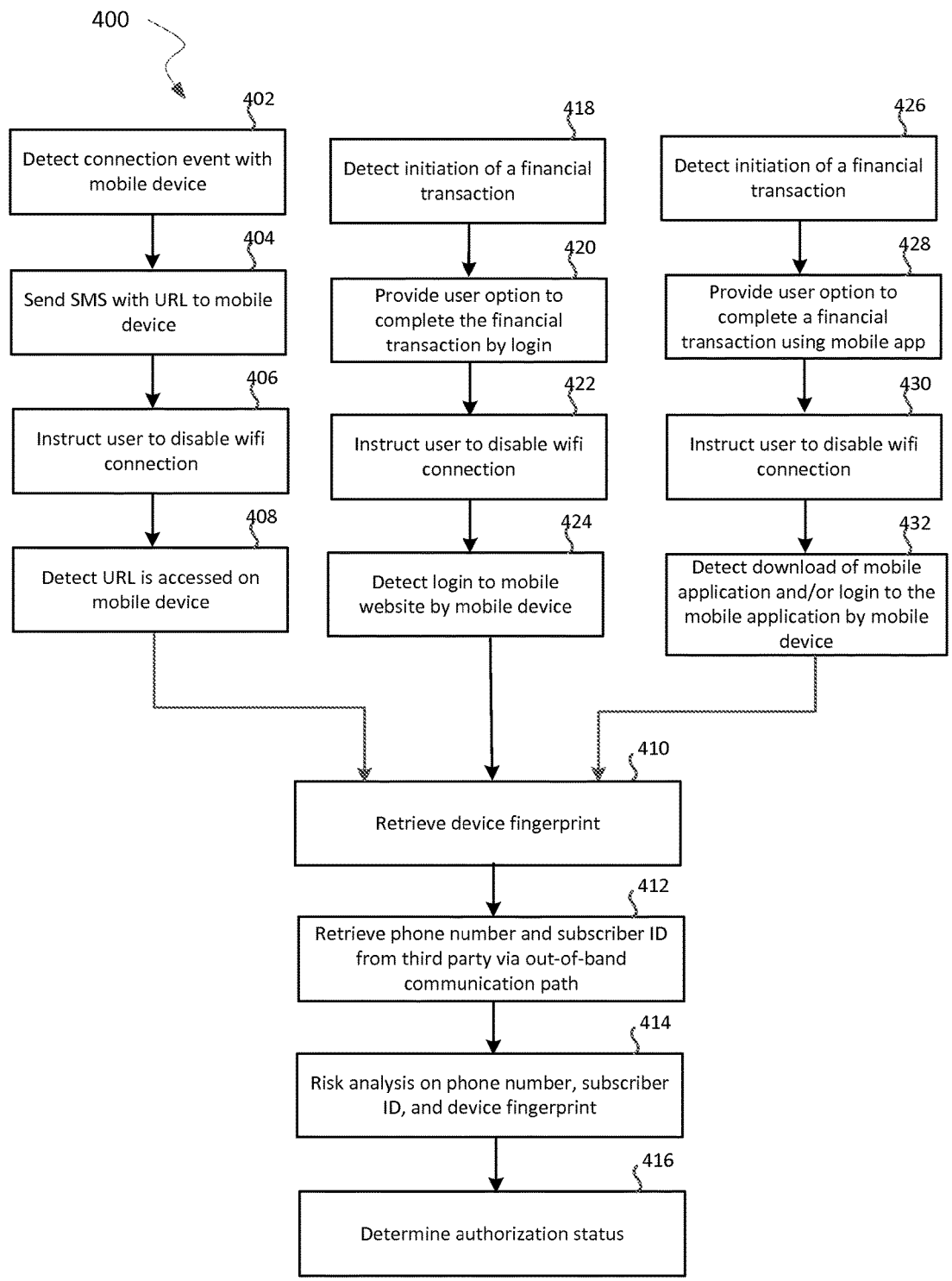
FIG. 4 is another block diagram of a method for validating a mobile device of a customer via a third party, according to various aspects various aspects of the present invention.

Turning now to FIG. 4, another method 400 for validating mobile devices of customers via third parties is illustrated. It is contemplated that the authentication method 400 is an out-of-band authentication performed in real-time by the host system 114 prior to movement of any monetary funds using the customer's mobile device and/or completion of any type of transaction, registration, login, password reset, or other application. For instance, the authentication method 400 may be utilized to establish credentials of a new customer and/or establish credentials of an existing customer. Further, the mobile device may comprise any device available for communication through a cellular network. It is noted that any of the steps shown in the method 400 may be optional and/or rearranged, and that the method 400 may include additional steps, intermediate or otherwise, not shown in the present illustration.

As shown in FIG. 4, in one aspect of the out-of-band authentication method 400, the host system may detect a connection event with the customer's mobile device (step 402). In response to detecting the connection event, the host system 114 may send a SMS to the mobile device, whereby the SMS may comprise a unique URL. In some aspects, the unique URL may be generated by the host system 114 in response to detecting the connection event and prior to sending the SMS. Further, the SMS may include user instructions to disable a WIFI connection of the mobile device prior to clicking or otherwise accessing the unique URL by a user through the mobile device. In other aspects, the user instructions to disable a WIFI connection may be transmitted through a webpage in a web browser of the mobile device (step 406). It is contemplated that temporarily disabling the WIFI connection permits subsequent communication, such as the mobile device accessing the unique URL, between the mobile device and the host system 114 via a cellular network, such as the first communication path 120 of FIG. 1. In some examples, a new unique URL will be sent via SMS by the host system 114 to the mobile device for the customer to try accessing again if the first attempt was unsuccessful. The host system 114 may detect through the first communication path 120 that the URL is accessed by the mobile device (step 408). Further, in some aspects, in response to detecting the access of the unique URL by the mobile device through the first communication path, the host system 114 and/or a server thereof may transmit a landing page to the mobile device in real-time through the first communication path. In this way, the unique URL points to a landing page that opens in a mobile browser of the mobile device.

In response to detecting that the unique URL has been accessed by the mobile device, the host system 114 may request and receive device fingerprint information, which may include one or more fields of information as listed above (step 410). Furthermore, the host system 114 may request and receive a phone number and/or a subscriber ID from the third party system 128 via the out-of-band communication path (step 412). For instance, the host system 114 may interact with the third party system 128 via an Ethernet or a WIFI connection and utilize an IP communication network. In some examples, the host system 114 may contact, through the second communication path in real-time, a web service application programming interface ("API") associated with the third party system 128 to request the phone number and the subscriber ID.

Further, the host system 114 may perform a risk analysis based on the retrieved phone number, subscriber ID, and the device fingerprint (step 414) and determine an authorization status of the customer's mobile device (step 416). In some aspects, the risk analysis may include comparing, by the host system 114, the retrieved phone number to a stored phone number, comparing the retrieved subscriber ID to a stored subscriber ID, and/or comparing the retrieved device fingerprint to a stored device fingerprint in real-time. It is contemplated that the stored phone number, stored subscriber ID, and/or stored device fingerprint may be locally accessible and/or stored by the host system 114, and may comprise user-entered data and/or previously identified data from previous attempts. For instance, the stored device fingerprint may comprise a table of device fingerprint metrics corresponding to one or more mobile devices associated with a particular customer. The host system 114 may determine using the comparison whether the customer and/or the mobile device being authenticated is a returning device/customer or a new device/customer. In some aspects, the risk analysis may instruct the host system 114 to perform additional layers of authentication, such as requesting the customer to confirm if a new device is being used and/or if the new device should be registered by the host system 114 for future access attempts. Further, the host system 114 may block or otherwise blacklist the mobile device and/or the customer upon determining a poor risk analysis, such as an unverified access, to control future access attempts of the mobile device. In yet another aspect, the risk analysis may produce an unverified access for the authentication status if the WIFI connection was not disabled prior to accessing the unique URL. In that case, the host system 114 may not be able to retrieve the phone number and/or the subscriber ID from the third party system 128, and therefore, the risk analysis may not be performed, thus resulting in an unverified access status.

Still in reference to FIG. 4, in another embodiment, the host system 114 may detect an initiation of a financial transaction (step 418) and/or initiation of any type of transaction, registration, login, password reset, or other application by the mobile device. The host system 114 may provide the customer with an option to complete the financial transaction by login to a mobile website via the mobile device (step 420). The host system 114 may further instruct the customer, via the mobile device, to disable a WIFI connection prior to logging into the mobile website using the mobile device (step 422). Subsequently, the host system 114 may detect the customer login to the mobile website utilizing the mobile device (step 424). It is contemplated that the host system 114 may deliver to the mobile device an error message or reminder if the WIFI connection was not disabled prior to login, and request the customer of the mobile device to try again. Steps 410-416 may follow, as discussed above, to complete the out-of-band authentication process prior to movement of any funds or completion of any type of transaction. The financial transaction may be completed, and/or terminated without movement of any funds, by the host system 114, based on the risk analysis and the authorization status determined at steps 410-416.

Referring again to FIG. 4, in yet another embodiment, the host system 114 may detect an initiation of a financial transaction (step 426) and provide a user option, to the customer's mobile device, to complete a financial transaction using a mobile application on the mobile device (step 428). The host system 114 may detect selection of the user option to complete verification using the mobile application, and further instruct the customer, via the mobile device, to disable any WIFI connections and/or enable cellular network connections in order to complete the financial transfer (step 430). In some aspects, the host system 114 may instruct the customer, via the mobile device, to download a mobile application onto the mobile device, whereby the mobile application may be utilized for authentication purposes. Subsequently, the host system 114 may detect at least one of the download of the mobile application and/or a login of the user into the mobile application by the mobile device (step 432). In some examples, the login may comprise entering a predetermined, valid username and/or password. Upon detecting a successful login event, steps 410-416 may follow, as discussed above, to complete the authentication process and/or financial transaction.

Figure 5:
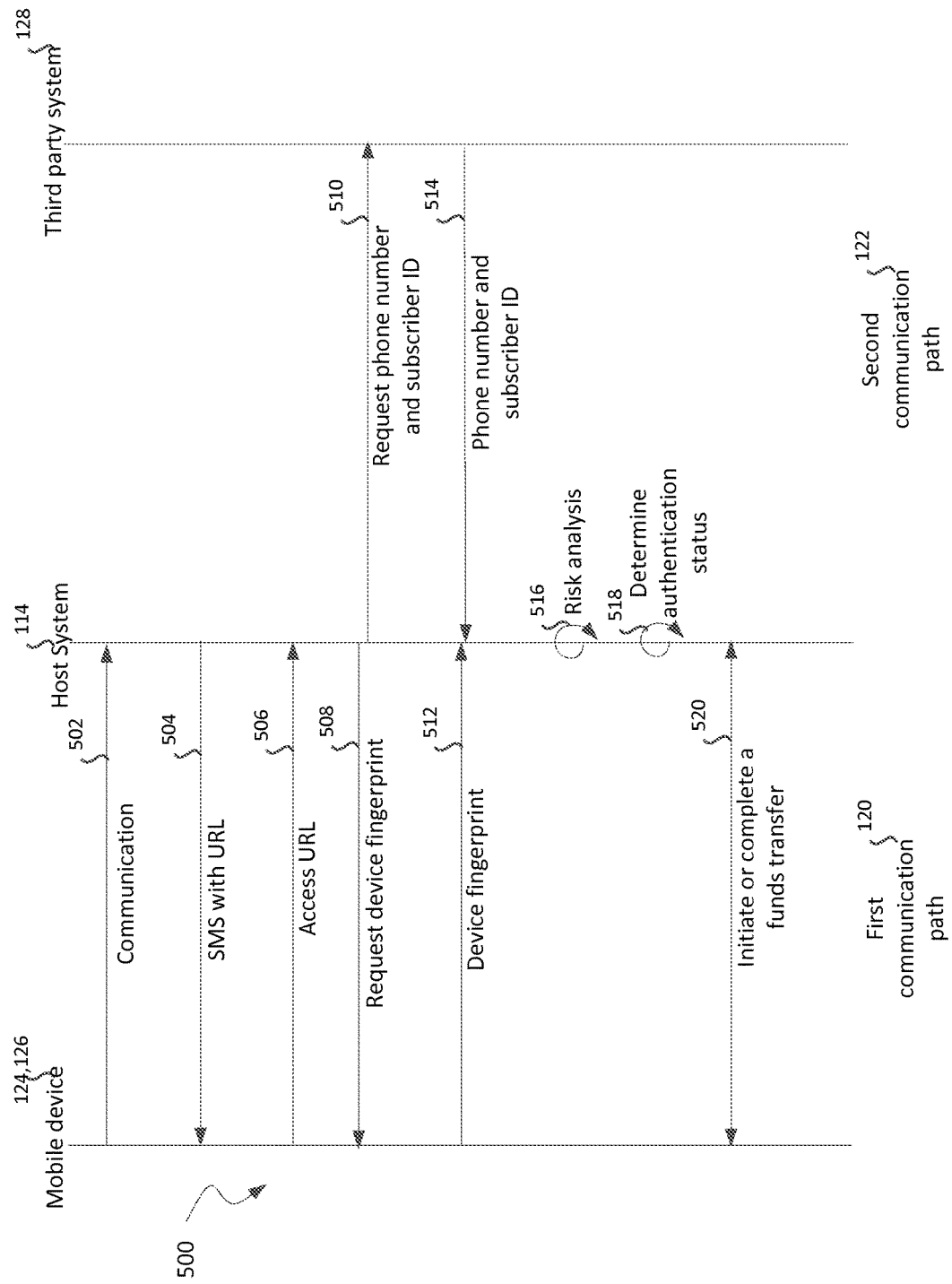
FIG. 5 is a flow diagram of a method for validating a mobile device of a customer via a third party and using an SMS text message, according to various aspects of the present invention.

Turning now to FIG. 5, a flow diagram for a SMS-based out-of-band authentication process 500 is illustrated, according to various embodiments of the present disclosure. It is contemplated that the flow diagram may include additional steps and that any of the steps shown may be optional and/or rearranged. The authentication process 500 may include detecting, by the host system 114, a communication 502 of the mobile device 124,126 with the host system 114, and sending, by the host system 114, a text message 504 comprising a unique URL to the mobile device 124,126. The text message 504 may be sent through a cellular network and/or an IP communications network. The authentication process 500 may further include detecting, by the host system 114, an access 506 of the unique URL by the mobile device through the first communication path 120. In some examples, the access 506 may comprise delivering to the mobile device a landing page upon clicking on the unique URL by the mobile device. In a preferred embodiment, the first communication path 120 utilizes a cellular network.

The authentication process 500 may include, in response to detecting the access of the unique URL by the mobile device 124,126, requesting, by the host system 114, in real-time, a device fingerprint 508 utilizing the first communication path 120 to identify the mobile device 124,126. In some aspects, the device fingerprint may include the operating system, the device type, device location, screen size, and/or any of the other fingerprint fields such as those provided in preceding paragraphs. Simultaneously, or about the same time as the request through the first communication path 120 is sent to the mobile device, the host system 114 may send a request 510 for a phone number and a subscriber ID associated with the mobile device 124,126 through the second communication path 122 distinct from the first communication path 120. The authentication process 500 may include receiving the device fingerprint 512 and the phone number and/or subscriber ID 514 through their distinct channels, simultaneously, or about the same time. Subsequently, the authentication process 500 may include performing a risk analysis 516 and based on the risk analysis, determining an authentication status 518 of the mobile device 124,126. Based on the authentication status 518, which may comprise a verified access or an unverified access, the host system 114 may initiate or complete a funds transfer 520 through the first communication path 120, or another communication channel. Further, following the authentication procedure, the host system 114 may instruct the customer to enable the WIFI connection. It is noted that the funds transfer 520 may be representative of any type of transaction, registration, login, password reset, or other application.

Figure 6:
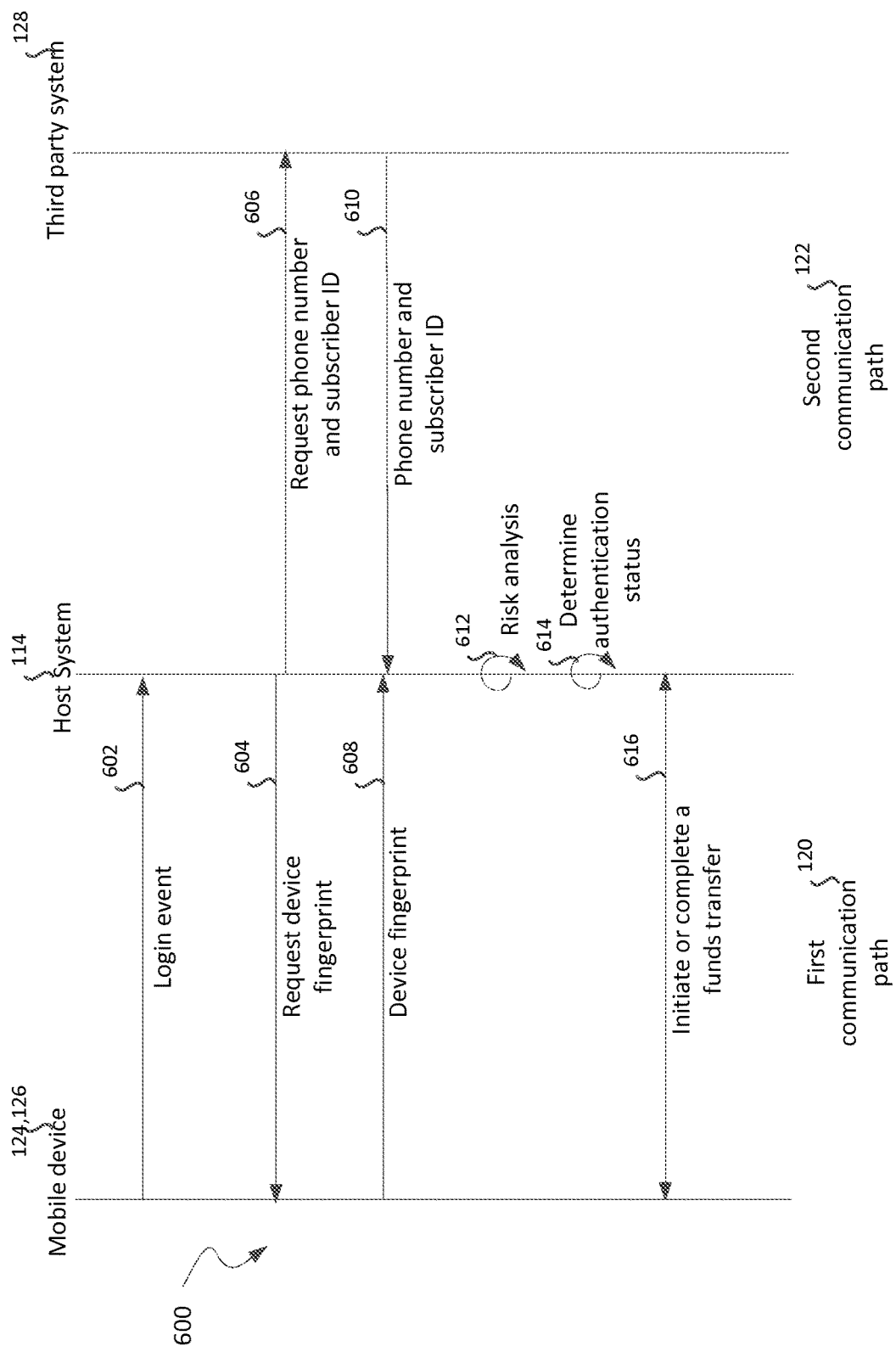
FIG. 6 is a flow diagram of a method for validating a mobile device of a customer via a third party upon a login event, according to various aspects of the present invention.

Referring now to FIG. 6, a flow diagram of a login-based out-of-band authentication process 600 is shown, according to various embodiments of the present disclosure. It is contemplated that the flow diagram may include additional steps and that any of the steps shown may be optional and/or rearranged. The authentication process 600 may include detecting, by the host system 114, a login event 602 of the mobile device 124,126. The login event may comprise a user login to a mobile website by the mobile device, downloading a mobile application to the mobile device, and/or a user login to a mobile application by the mobile device.

The authentication process 600 may include, in response to detecting the login event the mobile device 124,126, requesting, by the host system 114, in real-time, a device fingerprint 604 utilizing the first communication path 120 to identify the mobile device 124,126. In some aspects, the device fingerprint may include the operating system, the device type, device location, screen size, and/or any of the other fingerprint fields such as those provided in preceding paragraphs. Simultaneously, or about the same time as the request through the first communication path 120 is sent to the mobile device, the host system 114 may send a request 606 for a phone number and a subscriber ID associated with the mobile device 124,126 through the second communication path 122 distinct from the first communication path 120. The authentication process 600 may include receiving the device fingerprint 608 and the phone number and/or subscriber ID 610 through their distinct channels, simultaneously, or about the same time. Subsequently, the authentication process 600 may include performing a risk analysis 612 and based on the risk analysis, determining an authentication status 614 of the mobile device 124,126. Based on the authentication status, which may comprise a verified access or an unverified access, the host system 114 may initiate or complete a funds transfer 616 through the first communication path 120, or another communication channel. Furthermore, following the authentication procedure, the host system 114 may instruct the customer to resume enablement of a WIFI connection.

It is contemplated that the systems and methods described herein provide for a more secure and seamless mobile authentication experience for the customer at a time of login and/or new user sign-up. In some cases, the mobile fingerprint and at least one of the subscriber ID and the phone number are requested and utilized in the risk analysis for authentication purposes. In other cases, the mobile fingerprint may be utilized for the risk analysis, and at least one of the subscriber ID and the phone number may be utilized as a secondary verification purpose, for instance, if host system determines that the mobile fingerprint taken at the time of login does not match a previously stored mobile fingerprint. In that case, the phone number and/or the subscriber ID may be requested from the third party system and compared to the stored phone number and/or the stored subscriber ID as an example secondary or additional verification. Furthermore, it is noted that any or all aspects of the systems and methods described herein may be combined with other authentication and/or login procedures.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for authenticating a mobile device in real-time prior to movement of any funds in an associated funds transfer, the method comprising:
   detecting, by a host system, the mobile device in communication with the host system;
   sending, by the host system, a text message comprising a unique uniform resource locator ("URL") to the mobile device;
   detecting, by the host system, an access of the unique URL by the mobile device through a first communication path;
   requesting in real-time, by the host system, in response to detecting the access of the unique URL by the mobile device:
      a phone number and a subscriber identification ("ID") associated with the mobile device through a second communication path distinct from the first communication path, and
      a device fingerprint of the mobile device through the first communication path to identify the mobile device;
   receiving in real-time, by the host system, in response to requesting the phone number, the subscriber ID, and the device fingerprint by the host system:
      the phone number and the subscriber ID through the second communication path, and
      the device fingerprint through the first communication path;
   initiating, by the host system, a risk analysis based on the phone number, the subscriber ID, and the device fingerprint;
   comparing in real-time, by the host system, the phone number, the subscriber ID, and the device fingerprint with a stored phone number, a stored subscriber ID, and a stored device fingerprint, respectively, in response to initiating the risk analysis, wherein the stored device fingerprint is a previous device fingerprint obtained from a previous communication with the host system by the mobile device; and determining, by the host system, an authentication status of the mobile device based on the risk analysis, wherein the authentication status comprises at least one of a verified or an unverified access.

2. The method for authenticating the mobile device in real-time of claim 1, further comprising:
sending, by the host system, the text message comprising the URL to the mobile device through the first communication path,
wherein the first communication path comprises a first communication channel between the mobile device and the host system through a cellular network, and
wherein the second communication path comprises a second communication channel between the host system and a third party through an internet protocol ("IP") network.

3. The method for authenticating the mobile device in real-time of claim 1, further comprising:
sending, by the host system, user instructions to disable a WIFI connection prior to accessing the URL,
wherein the text message comprises the user instructions.

4. The method for authenticating the mobile device in real-time of claim 1, further comprising:
in response to detecting the access of the unique URL by the mobile device through the first communication path, transmitting, by the host system, a landing page to the mobile device in real-time through the first communication path,
wherein the landing page opens in a mobile browser of the mobile device.

5. The method for authenticating the mobile device in real-time of claim 1, further comprising:
requesting, by the host system, the phone number and the subscriber ID from a third party through the second communication path,
wherein the third party is distinct from the host system.

6. The method for authenticating the mobile device in real-time of claim 1, further comprising:
wherein at least one of the device fingerprint and the stored device fingerprint comprises at least one of a user location, device name, network name, capacity figure, available capacity figure, operating system name, operating system version, carrier identification, model identification, serial number, one or more mobile apps installed, contacts, cookies, flash objects, browser plugins, gyro status, Bluetooth adapter, and MAC address.

7. The method for authenticating the mobile device in real-time of claim 1, further comprising:
in response to the comparison, determining, by the host system in real-time, the authentication status is the verified access based on a match of at least the phone number and the subscriber ID with the stored phone number and the stored subscriber ID, respectively.

8. The method for authenticating the mobile device in real-time of claim 7, further comprising:
based at least in part on the determined verified access, completing, by the host system, a funds transfer,
wherein the funds transfer comprises moving a monetary amount from one account to another account.

9. The method for authenticating the mobile device in real-time of claim 1, further comprising:
in response to the comparison, determining, by the host system in real-time, a mismatch of the device fingerprint and the stored device fingerprint;

in response to the mismatch, requiring, by the host system in real-time, a secondary verification with the mobile device; and
based at least in part on the secondary verification, determining, by the host system, the authentication status is the verified access having a different mobile device.

10. The method for authenticating the mobile device in real-time of claim 1, further comprising:
in response to detecting the mobile device in communication with the host system, generating, by the host system in real-time, the unique URL.

11. The method for authenticating the mobile device in real-time of claim 1, further comprising:
in response to detecting the mobile device in communication with the host system, establishing, by the host system, the second communication path with a third party system in real-time,
wherein the second communication path is an out-of-band path.

12. The method for authenticating the mobile device in real-time of claim 1,
wherein the first communication path and the second communication path utilize different communication channels in a same communication network.

13. The method for authenticating the mobile device in real-time of claim 1, further comprising:
wherein the first communication path and the second communication path utilize different communication channels in different communication networks.

14. The method for authenticating the mobile device in real-time of claim 1, further comprising:
contacting, by the host system through the second communication path in real-time, a web service application programming interface ("API") associated with a third party to request the phone number and the subscriber ID.

15. The method of for authenticating the mobile device in real-time of claim 1, wherein the subscriber ID comprises an indentifier of the mobile phone line carrier account.

16. A host system for authenticating a mobile device in real-time prior to movement of any funds in an associated funds transfer, comprising:
one or more processors; and
a memory communicatively coupled with and readable by the one or more processors and having stored therein processor-readable instructions that, when executed by the one or more processors, cause the one or more processors to:
detect, by the host system, the mobile device in communication with the host system;
send, by the host system, a text message comprising a unique uniform resource locator ("URL") to the mobile device;
detect, by the host system, an access of the unique URL by the mobile device through a first communication path;
request in real-time, by the host system in, response to detecting the access of the unique URL by the mobile device:
a phone number and a subscriber identification ("ID") associated with the mobile device through a second communication path distinct from the first communication path, and
a device fingerprint of the mobile device through the first communication path to identify the mobile device;

receive in real-time, by the host system, in response to requesting the phone number and the subscriber ID by the host system:
  the phone number and the subscriber ID through the second communication path, and
  the device fingerprint through the first communication path;
initiate, by the host system, a risk analysis based on the phone number and the subscriber ID;
compare in real-time, by the host system, in response to initiating the risk analysis, the phone number, the subscriber ID, and the device fingerprint with a stored phone number, a stored subscriber ID, and a stored device fingerprint, respectively, wherein the stored device fingerprint is a previous device fingerprint obtained from a previous communication with the host system by the mobile device; and
determine, by the host system, an authentication status of the mobile device based on the risk analysis, wherein the authentication status comprises at least one of a verified or an unverified access.

17. A method for authenticating a mobile device in real-time prior to movement of any funds in an associated funds transfer, comprising:
  detecting, by a host system through a first communication path, a login event to a mobile website by the mobile device in communication with the host system;
  requesting in real-time, by the host system, in response to detecting the login to the mobile website by the mobile device:
    a phone number and a subscriber identification ("ID") associated with the mobile device through a second communication path distinct from the first communication path, and
    a device fingerprint of the mobile device through the first communication path to identify the mobile device;
  receiving in real time, by the host system, in response to requesting the phone number, the subscriber ID, and the device fingerprint by the host system:
    the phone number and the subscriber ID through the second communication path, and
    the device fingerprint through the first communication path;
  initiating, by the host system, a risk analysis based on the phone number, the subscriber ID, and the device fingerprint;
  comparing in real-time, in response to initiating the risk analysis, the phone number, the subscriber ID, and the device fingerprint with a stored phone number, a stored subscriber ID, and a stored device fingerprint, respectively, wherein the stored device fingerprint is a previous device fingerprint obtained from a previous communication with the host system by the mobile device; and
  determining, by the host system, an authentication status of the mobile device based on the risk analysis, wherein the authentication status comprises at least one of a verified or an unverified access.

18. The method of authenticating the mobile device in real-time of claim 17,
  wherein the login event comprises a user login to a mobile website by the mobile device.

19. The method of authenticating the mobile device in real-time of claim 17,
  wherein the login event comprises at least one of downloading a mobile application to the mobile device and a user login to the mobile application by the mobile device.

* * * * *